United States Patent [19]

Gulistan

[11] Patent Number: 4,553,890

[45] Date of Patent: Nov. 19, 1985

[54] CAPTIVE PANEL SCREW

[76] Inventor: Bulent Gulistan, 20568 Pinnacle Way, Malibu, Calif. 90265

[21] Appl. No.: 543,501

[22] Filed: Oct. 19, 1983

Related U.S. Application Data

[63] Continuation-in-part of Ser. No. 388,459, Jun. 14, 1982, abandoned.

[51] Int. Cl.[4] .................. F16B 21/00; F16B 39/38
[52] U.S. Cl. ................................ 411/318; 411/347; 411/411
[58] Field of Search ............... 411/105, 253, 254, 299, 411/316, 317, 318, 347, 348, 252, 264, 383, 411, 417, 422

[56] References Cited

U.S. PATENT DOCUMENTS

| 579,553 | 3/1897 | Bassford | 411/318 |
|---|---|---|---|
| 841,025 | 1/1907 | LeSueur | 411/318 |
| 1,639,211 | 8/1927 | Campo | 411/318 |
| 2,361,491 | 10/1944 | Nagin | 411/347 |
| 2,426,099 | 8/1947 | Hershowitz | 411/347 X |
| 3,097,559 | 7/1963 | Chapman | 411/348 |
| 3,361,176 | 1/1968 | Jansen | 411/347 |
| 3,561,516 | 2/1971 | Reddy | 411/347 |
| 4,285,380 | 8/1981 | Gulistan | 411/353 |
| 4,358,941 | 11/1982 | Zimmer | 411/910 |

FOREIGN PATENT DOCUMENTS

| 474436 | 4/1929 | Fed. Rep. of Germany | 411/318 |
|---|---|---|---|
| 685495 | 12/1939 | Fed. Rep. of Germany | 411/347 |
| 1919463 | 4/1971 | Fed. Rep. of Germany | 411/347 |
| 430138 | 8/1911 | France | 411/318 |

Primary Examiner—Thomas J. Holko
Attorney, Agent, or Firm—John E. Kelly

[57] ABSTRACT

The captive screw has an enlarged head to prevent complete passage of the screw through a bore in a panel. The shank of the screw has a side opening incorporating a retractable latch radially extending from the shank. This latch has upper and lower sloping cam surfaces at its forward end. The lower surface is oriented such that urging of the screw inwardly through the bore in the panel retracts the latch. The latch is spring-biased radially outwardly so that after the latch clears the bore, the screw is held captive. The upper cam surface of the latch intercepts the lower cam surface in a line which is tilted at an angle corresponding to the helix angle of the threads in a nut receiving the screw in an adjacent panel. The screw can thus be threaded into this nut to close the panel and the latch will function as a thread lock. In addition, should the nut be shallow, so that the screw extends out the other end to a point where the latch is free to pop out, the screw can still be removed by applying sufficient unthreading force that the latch is biased inwardly by its upper sloping cam surface and the fact that this cam surface end is at a tilted angle corresponding to the helix angle of the nut threads.

2 Claims, 4 Drawing Figures

CAPTIVE PANEL SCREW

This application is a continuation-in-part of my copending application Ser. No. 388,459 filed June 14, 1982 and entitled CAPTIVE PANEL SCREW, now abandoned.

FIELD OF THE INVENTION

This invention relates generally to fasteners and more particularly to an improved captive panel fastener screw.

BACKGROUND OF THE INVENTION

Many present day captive-type panel screws include two or more parts which must be assembled to secure the screw to a panel opening. The basic idea of the captive screw is to avoid losing the screw and in this respect, the assembled captive screw is retained in a panel opening but is free to move axially as well as rotationally. Thus, a cooperating member or panel having a nut or tapped opening can receive the captive panel screw and when the captive screw is tightened, the entire assembly is rigid.

One problem associated with prior art captive panel screws is that a flaring or equivalent operation is required to attach the captive screw assembly to an opening in a panel. Normally one of the assembly members must be fitted through the opening and an extending wall portion peened over radially outwardly to capture the member in the opening. This member in turn holds the screw itself in a captive relationship, but will permit the necessary axial and rotational movement of the screw. Such securement operations of the screw to the panel require both time and labor which necessarily increases expenses. Further, such screws usually require a thread locking element to hold the screw secure against vibrations.

BRIEF DESCRIPTION OF THE PRESENT INVENTION

With the foregoing considerations in mind, the present invention contemplates an improved load carrying captive panel screw which does not require any particular flaring operations or special tools to secure the screw in a captive relationship to a panel. Further, it provides an automatic thread lock.

More particularly, the captive panel screw of this invention can be readily attached to the panel by simply urging it through a panel bore size to receive the screw and once in place in the bore, the screw is held captive yet is free to axially and rotatably move for securing another member or panel.

In is broadest aspect, the captive panel screw has a retractable catch radially extending from its side to block removal of the screw from a panel bore after the screw has been passed through the bore. The screw itself has an enlarged head to prevent complete passage of the same through the bore and the catch has sloping cam surfaces oriented such that urging of the screw inwardly through the bore in the panel retracts the catch. The screw includes means biasing the catch radially outwardly so that after the catch clears the bore, the screw is held captive. The sloping cam surfaces intercept each other on the nose of the latch in a line tilted at an angle equal to the helix angle of the threads in a nut receiving the screw. As a result, should the nut be sufficiently shallow that the screw extends out the exit end of the nut a distance to permit radial outward movement of the latch member, the screw can still be unthreaded from the nut by exerting sufficient upward force and unthreading force such that the latch member sloping upper cam surface and forward tilt at the helix angle of the nut threads enables the retraction of the latch member into the bore of the screw so that unthreading and removal can take place.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
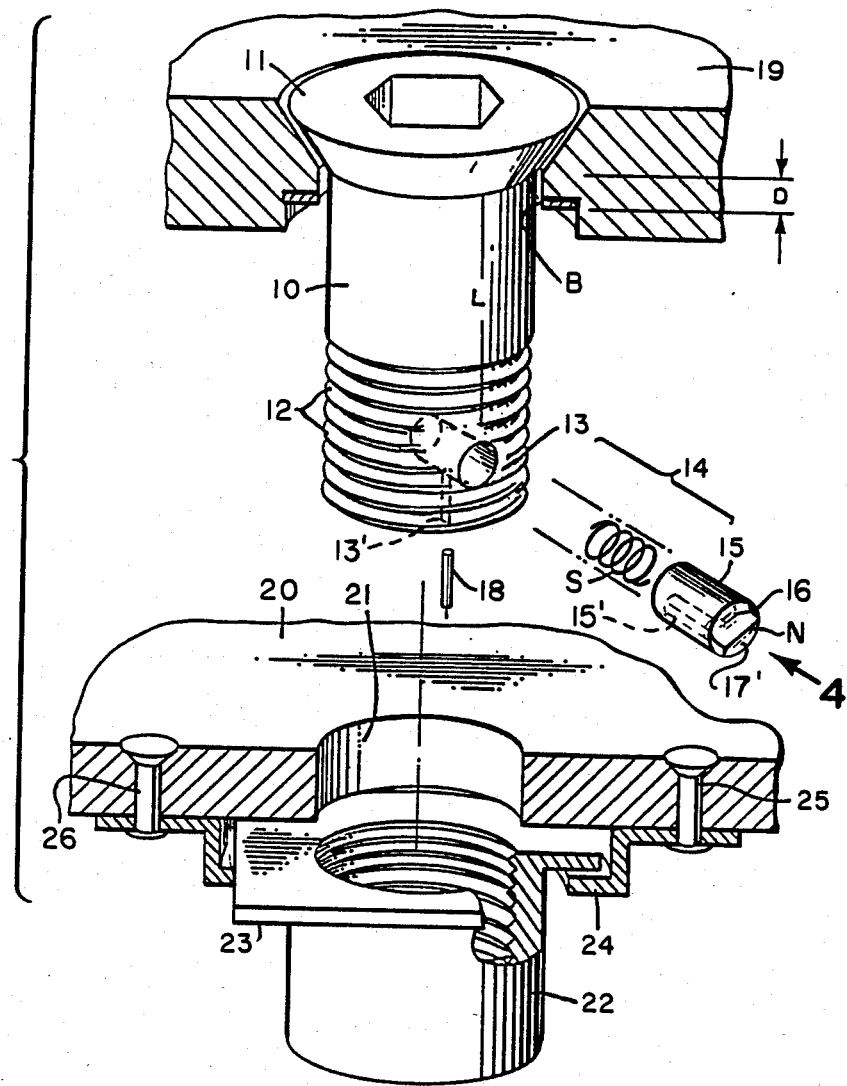
FIG. 1 is a cut-away fragmentary, exploded, perspective view of the captive panel screw of this invention further illustrating a cooperating floating nut and second panel.

Referring first to FIG. 1, the captive panel screw comprises a shank 10 having a head 11 at one end and threads 12 at its other end. Shank 10 includes a side opening 13 at a point a given axial length L from the head 11.

A catch means embraced within the bracket 14 is shown exploded away from the opening 13. This catch means comprises a latch member 15 terminating on its forward end in a single upper sloping cam surface 16 and a single lower sloping cam surface 17 so that the forward end of the latch member is V-shaped. The opening 13 includes a small hole 13' in its floor extending to the lower end of the screw for receiving a guide pin 18 in a press fit. The upper end of the pin 18 is received in a channel 15' formed in the bottom of the latch 15. The catch means is completed by the provision of a biasing means in the form of a compression spring S.

When the components of the catch means are properly assembled within the side opening 13, the spring S is first received within the opening and then the latch member 15 is received with its channel 15' facing downwardly. The guide pin 18 is then inserted in the hole 13' from the bottom of the screw, the upper end of the pin being received in the channel so that rotation of the latch is prevented and the cam surfaces 16 and 17 are always oriented to face upwardly and downwardly respectively. The latch member 15 and spring S are retained within the opening 13 by the same pin 18 and the fact that its upper end is captured between the closed ends of the channel 15'.

Still referring to the upper portion of FIG. 1, the captive panel screw 10 is shown received in a first panel 19 having an appropriate bore B. The axial distance of the bore B surrounding the shank 10 immediately beneath the head 11; that is at the end of the recessed portion, is indicated at D.

Referring now to the lower portion of FIG. 1, there is shown a second or cooperating panel 20 provided with a bore opening 21 for receiving the screw shank 10. On the underside of the panel 20 there is a conventional floating nut 22 having an upper radially outwardly extending rectangular flange 23. This flange is held loosely captive by rectangular flange 24 secured as by rivets 25 and 26 to the panel 20. It will be noted that there is provided spacing for tilting and lateral movement of the nut 22 within the rectangular flange 24. By this arrangement, when the upper panel 19 closes against the panel 20, any slight misalignment between the bores in the panel or any slight deviation from a parallel relationship between the panels when closed will be compensated for by the floating nut 22. In other words, this nut 22 can tilt or move laterally as necessary to be properly aligned with the captive screw. After the screw is tightened, then the members are held rigidly together.

Figure 2:
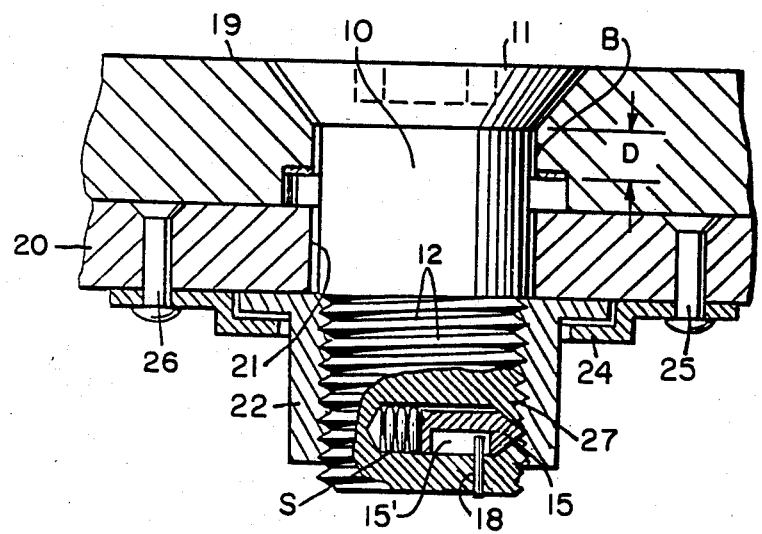
FIG. 2 is a side view, partly in cross section, of the components of FIG. 1 in assembled relationship.

The foregoing will be better understood by referring to FIG. 2 wherein the captive screw is shown fully threaded into the floating nut 22 to hold the panels 19 and 20 together. Since the length L is greater than the axial length D of the bore B as shown in FIG. 1, the catch means made up of the latch member 15 with surfaces 16 and 17 and compression spring S will be juxtaposed the threads of the nut 22 clear of the bottom of the bore B. In this retracted first position, the spring S is made sufficiently strong to exert a relatively large force on the latch member to bias the same against the threads of the nut 22 and thereby serve as a thread lock. The sloping surface 17 on the nose of the latch member will serve to retract the latch as it is threaded into the nut 22 as when it is passed through the bore B of the panel 19 of FIG. 1.

Figure 3:
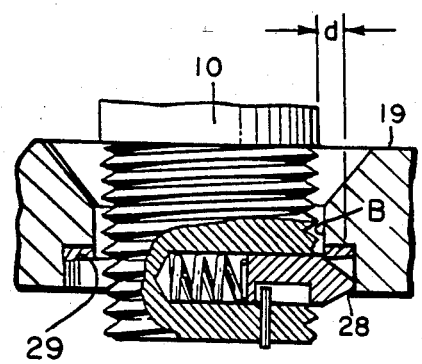
FIG. 3 is a fragmentary view partly in cross section showing the captive screw after the panels of FIG. 2 have been separated.

FIG. 3 illustrates the latch member in its second position wherein the front of the latch extends laterally a given distance d beyond the radius of the periphery of the bore B so as to clear the bore and prevent retraction of the screw shank 10 out from the bore in the panel 19.

With respect to the foregoing and as shown in FIG. 3, the exit periphery of the bore B in the panel is recessed, as indicated at 28 so that when the screw is unthreaded from the floating nut 22 shown in FIG. 2, there will be space for the nose of the latch to pop out under a stainless steel washer 29 to its second position and thereby prevent complete removal of the screw 10 so that it is still held captive to the panel 19.

Figure 4:
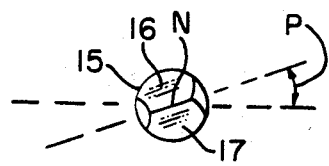
FIG. 4 is an end view of the screw latch member looking in the direction of the arrow 4 of FIG. 1.

Referring to FIG. 4, it will be noted that the upper sloping cam surface 16 on the forward portion of the latch member intercepts the lower cam surface 17 in tilted line at the nose N of the latch. This tilt angle indicated at P is made equal to the helix angle of the threads of the nut 22 receiving the screw.

Referring once again to FIG. 2, if the nut 22 were shallower than shown, the end of the screw 10 could possibly extend out of the lower end of the nut 22 a sufficient distance that the latch 15 could pop out under the lower exit end of the nut 22. If such should happen, the screw 10 can still be removed by exerting an upward force and unthreading the same, since the angle of the nose N of the latch is at the same helix angle as the threads of the nut. The sloping cam surface arrangement will thus permit this understanding of the screw from the nut in the event the screw 10 should be threaded too far into the nut, such that the latch pops out.

From all of the foregoing, it will now be evident that the present invention has provided a very simple captive panel screw. In assembling the screw to a panel, it is only necessary to initially urge it through the bore in the panel such as the bore B shown in FIG. 1, this action retracting the catch means as a consequence of the lower sloping cam surface 17 into the opening 13. After the opening has cleared the lower end of the bore B the latch will pop out and thus will hold the screw captive. As mentioned earlier, the latch member itself also serves as a thread lock when the captive panel is in fastened position.

Modifications falling within the scope and spirit of this invention will occur to those skilled in the art. The captive panel screw accordingly is not to be thought of as limited to the exact embodiment set forth merely for illustrative purposes.

I claim:

1. A captive panel screw including, in combination:
   (a) a shank having a head at one end and threads at its other end, said shank including a side opening at a point a given axial length from said head;
   (b) a catch means positioned in said side opening and radially movable from a first position in which the catch means is wholly received in the opening to a second position in which the catch means partially extends from said opening a given distance, said given axial length being greater than the axial length of a bore in a panel to which the screw is to be held captive and said given distance extending beyond the radius of the bore periphery of the bore in the panel whereby said screw is held captive in said bore when said catch means is in said second position, said catch means comprising a latch member terminating on its forward end in a single lower sloping cam surface oriented such that urging of the screw inwardly through the bore in the panel retracts the latch member into its said first position in said opening, said latch member also having a single upper sloping cam surface on its forward end so that said forward end is V-shaped with said upper surface intercepting said lower cam surface in a line at the nose of said latch tilted at an angle equal to the helix angle of the threads in a nut receiving said screw,; and spring means in the opening urging said latch member towards its said second position extending from said opening, said side opening having a hole in its floor extending to the end of the screw, said latch member having a channel on its underside; and (c) a guide pin received in said hole with its upper end received in said channel for holding said latch member against rotation and limiting its in and out movement between said first and second positions whereby the latch member is prevented from falling out of said opening and whereby should the nut be sufficiently shallow that the screw extends out the exit end of the nut a distance to permit radial outward movement of the latch member, the screw can still be unthreaded from the nut by exerting sufficient upward force and unthreading force such that the latch member sloping upper cam surface and forward end tilt at the helix angle of the nut threads enables the retraction of the latch member into the opening in the screw so that unthreading and removal can take place.

2. A screw according to claim 1, including, in combination, said panel to which the screw is held captive, the exit end of the bore through which the screw passes in the panel being recessed to provide a space to accommodate said catch means when in said second position, said catch means further functioning as a thread lock when said screw is threaded into a mating nut.

* * * * *